D. M. KENNEDY.
DRAFT HARNESS FOR OXEN AND CATTLE.
APPLICATION FILED JUNE 3, 1913.

1,152,737.

Patented Sept. 7, 1915.

WITNESSES:
John C. Sanders
H. B. Cottrell

INVENTOR:
Dennis Meade Kennedy
BY Wallace White
ATTY.

UNITED STATES PATENT OFFICE.

DENNIS MEADE KENNEDY, OF DURBAN, NATAL, SOUTH AFRICA.

DRAFT-HARNESS FOR OXEN AND CATTLE.

1,152,737.   Specification of Letters Patent.   Patented Sept. 7, 1915.

Application filed June 3, 1913. Serial No. 771,398.

*To all whom it may concern:*

Be it known that I, DENNIS MEADE KENNEDY, of 106 Montpelier road, Durban, Natal, South Africa, engineer, have invented certain new and useful Improvements in and Relating to Draft-Harness for Oxen and Cattle, of which the following is a specification.

This invention relates to draft harness for oxen, for use where two or more oxen are yoked together side by side, and the invention has for its object to provide a simple and self-contained yoke harness which, while enabling the animals to work under more comfortable conditions, can be put on with the minimum of time and trouble.

A harness made in accordance with this invention comprises two or more collars joined together by a transversely arranged yoke member. This yoke member is attached to the top of each collar by a pivoted or swiveling connection, and the said yoke may be cranked at a point between each pair of collars to receive the center or trek chain, as for carrying the dissel boom, or pole, of the vehicle. The collars which carry the draft chains each comprise a frame or wale attached to or carrying the padding for the hump and shoulders and adapted to fit over the neck of the animal, the lower portion of the frame being adapted to be opened and closed by means of a hinged frame member having a suitable fastening in the closed position. Suitable hooks are provided on the collar to which the draft chains are attached, and the position of these hooks on the collar may be made adjustable in order to suit different animals. With such a combined yoke harness it will be seen that the entire neck harness and yoke can be put on simply by passing the open collars on to the necks of the beasts and closing the hinged members, it only then remaining to attach the neck harness and yoke to the load to be drawn.

Figure 1:
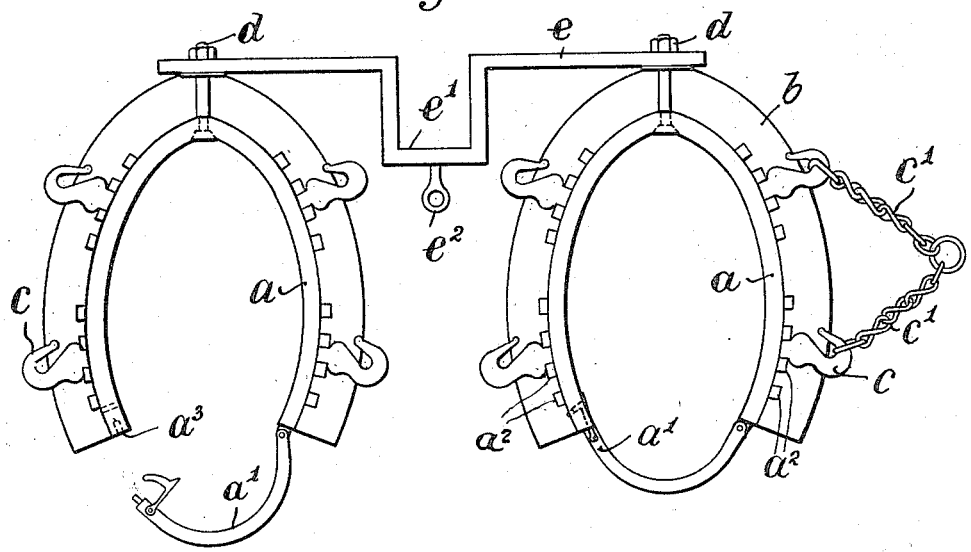
Figure 2:
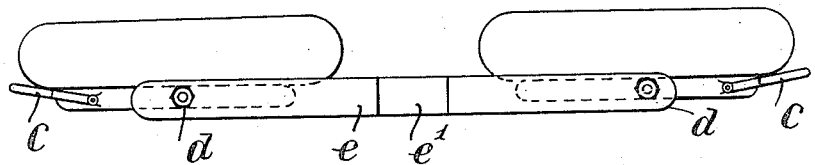

In the accompanying drawings which illustrate a construction of the harness suitable for a pair of oxen: Figure 1 is a front view and Fig. 2 is a plan view.

In this construction each collar is formed of a frame $a$, of wood, metal or other suitable material, carrying or attached to the padded or upholstered part, $b$. The attachment may be made by forming the frame $a$ of a rounded tube or bar of metal and covering the same with material which forms part of or is attached to the covering material of the padded part $b$. The lower part of frame $a$ is completed by member $a'$, which member is hinged to one side of the frame $a$, and fastened to the other by any suitable catch, such as $a^3$.

The hooks, $c$, for carrying the draft chains, are attached at suitable points to the frame $a$. Any suitable number of such hooks may be employed, and their position may be made adjustable on the frame $a$ in any convenient way, for instance, as that shown, a series of lugs such as $a^2$ may be provided so that the shank of the hook may be placed and fastened in between any pair of lugs. Two or more of the hooks $c$ may be coupled together by a short length of chain, such as $c'$, to which the draft chains are attached. The top of each collar is provided with a pivot, $d$, attached firmly to the frame $a$, and adapted to receive the yoke member $e$ which is adapted to pivot thereon. The said yoke is preferably cranked at or near its center to receive the dissel boom or pole of the vehicle, and is also provided with an eye, $e^2$, for carrying the center or "trek" chain.

The use of the combined collar and yoke harness will greatly facilitate the harnessing and will also increase the draft powers of the cattle and reduce their sufferings.

The pivoted connection of the yoke and collar permits the oxen some freedom of movement while keeping them the required distance apart and the whole harness can be made lighter and stronger than is usual.

What I claim and desire to secure by Letters Patent is:

A draft harness for oxen comprising, in combination, a plurality of collar frames yoked together at the top only, hump and shoulder padding fixed to each collar frame at the top and sides, a yoke piece pivotally connecting the collars at the top, a frame member hinged at the lower part of each frame and arranged to be opened and closed, and attaching means at the sides of the frames for receiving the draft connections whereby the combined yoke harness as a whole can be put on by passing the opened collars onto the necks of the team and closing the hinged members.

In testimony whereof I have signed my name to this specification in the presence of two subscribing witnesses.

DENNIS MEADE KENNEDY.

Witnesses:
HENRY ALLEN PRYOR,
ALFRED EDWARD GRAY.

Copies of this patent may be obtained for five cents each, by addressing the "Commissioner of Patents, Washington, D. C."